United States Patent Office 3,186,386
Patented June 1, 1965

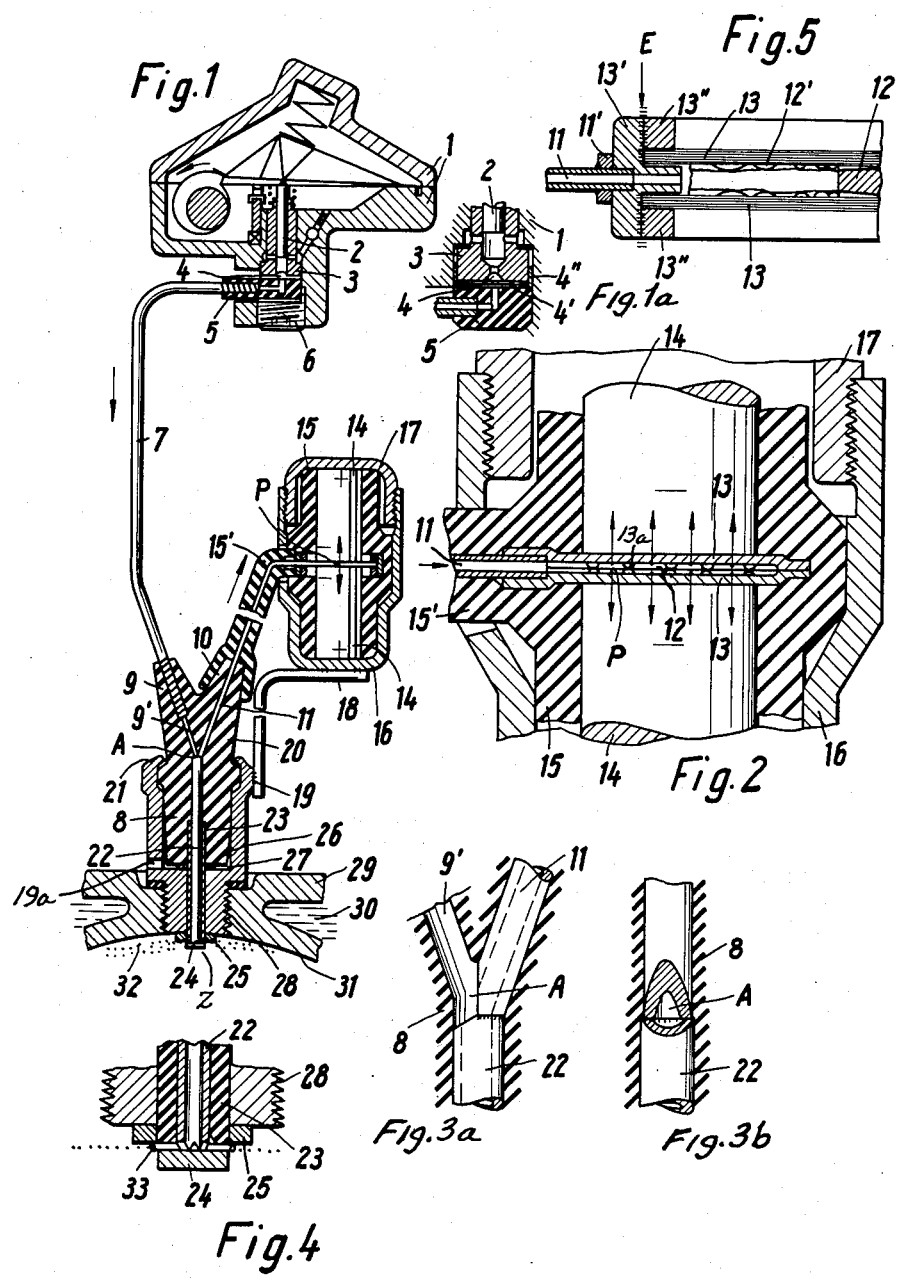

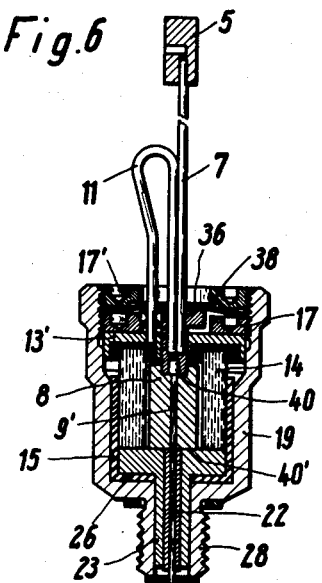
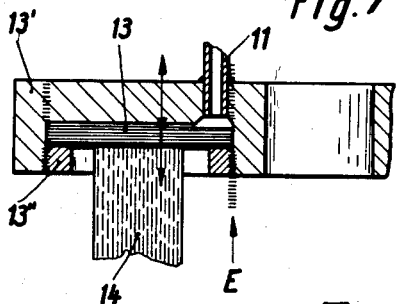
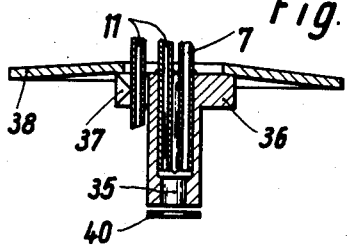
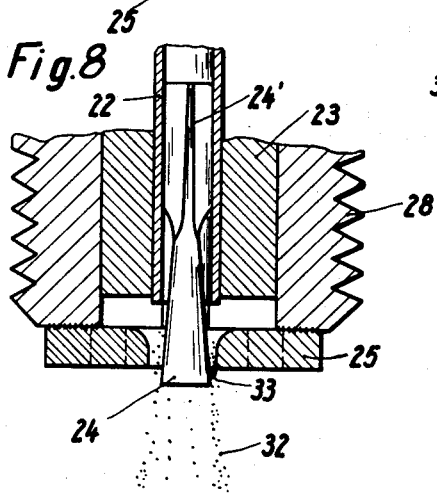
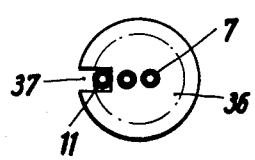
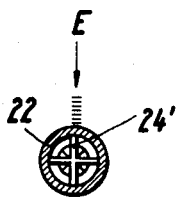

3,186,386
COMBINED FUEL INJECTION AND IGNITION SYSTEM FOR INTERNAL COMBUSTION ENGINES
Hermann Papst, St. Georgen, Black Forest, Germany
Filed Nov. 14, 1962, Ser. No. 237,634
Claims priority, application Germany, Nov. 15, 1961, P 28,233
17 Claims. (Cl. 123—32)

The invention relates to internal combustion engines in which the fuel is injected into the compressed air within the combustion chamber.

For internal combustion engines with fuel injection into compressed air it is a considerable advantage if the injected fuel stream is ignited as it enters the beginning of the internal combustion chamber. In this way entrance of unburned fuel into the combustion chamber and subsequent ignition of such unburned fuel is prevented. The ignition lag of diesel engines which is causing the well-known hard noise and the well-known knocking of gas engines is thereby also avoided.

It has already been proposed to use injection nozzles which control, respectively interrupt, the ignition current. These devices are satisfactory only when they are operating very precisely so that considerable expenses for manufacture and maintenance are involved. Furthermore it has been very difficult to adjust the ignition timing of such devices so that it corresponds with the actual beginning of the injected stream which is easily understood when taking into consideration that the whole injection time is shorter than half a millisecond.

It has also been proposed to ignite the fuel by means of spark-plugs which are energized by a piezo-electric generator, said generator being operated by a pump driven by a cam. Hitherto it has been impossible to operate internal combustion engines successfully by such devices, owing to difficulties of synchronizing the beginning of the injection and of the ignition, said difficulties caused probably by variations of the time lag in the ignition system.

It is one of the objects of the invention to provide a better ignition system which has not the aforesaid disadvantages.

One of the principal objects of the invention is a combined fuel injection and ignition system with a better synchronization of the fuel injection and of the electric ignition.

It is a further object of the invention to provide simple but very effective means for obtaining very good synchronization of the fuel injection and the electric ignition.

With these and other objects in view, which will become apparent in the following detailed description, the present invention will be clearly understood in connection with the accompanying drawings which show diagrammatically an embodiment of the invention and in which FIGURE 1 is a cross-section through the main parts of a combined fuel-injection and ignition system, FIGURES 1a and 2 are details of FIGURE 1 in enlarged scale, FIGURES 3a and 3b are cross-sections through a branching of the feeding tube, FIGURE 4 is a cross-section in enlarged scale through the end of the nozzle of FIGURE 1, FIGURE 5 is a cross-section through a variation of the pressure chamber for exciting a piezo-electric generator, FIGURE 6 is a cross-section through another embodiment of the invention showing the nozzle body with built-in piezo-electric generator, FIGURE 7 is a cross-section in enlarged scale through a detail of FIGURE 6, FIGURE 8 is a cross-section in enlarged scale through another detail of FIGURE 6, FIGURE 9 is a view into the lower end of the nozzle of FIGURE 8, FIGURE 10 is a cross-section in enlarged scale through another detail of FIGURE 6, FIGURE 11 is a plane view on one part shown in FIGURE 10.

In the drawings corresponding parts have been numbered in all figures with the same numbers. Referring now to the drawings and in particular to FIGURES 1 and 2, the present device comprises an injection pump 1 having a piston 2 within cylinder 3, a pressure valve 4, a ceramic clamping piece 5 which by means of a screw 6 tightly fastens one end of a capillary tube 7. The other end of the capillary tube 7 is fastened within end 9 of a ceramic piece 8. Within said ceramic piece 8 at point A near the nozzle Z another tube 11 is branched leaving the nozzle body at its extension 10. Tube 11 serving as delay adapter is leading to the hollow interior 12 between the elastic walls 13 of the pressure chamber. The walls 13 are touching the piezo-electric generators 14 and are strongly pressing them when the pressure within tube 11 and the hollow interior of the pressure chamber is suddenly rising. Details of the pressure chamber are shown in FIGURE 2 in enlarged scale. The pressure chamber is flat and within its hollow interior 12 there is only a little quantity of oil.

The pressure chamber is made of two elastic sheets 13 connected by welding, both sheets having on their inner sides projections 13a which are pressed against the projections of the other sheet when there is no oil pressure. When by operation of injection pump 1 the pressure through capillary tubes 7 and 11 is reaching the interior 12 of the pressure chamber, a high pressure is suddenly acting against piezo-electric pieces 14. The area of the pressure chamber is only about 1 cm.² and its walls 13 and 13′ are moved only by some hundredth of millimeters so that the fluctuating quantity of oil amounts only to few cubic millimeters. A soft elastic insulating member 15 having an extension 15′ serves to insulate against the generated high tension.

The piezo-electric high tension generator shown in detail in FIGURE 2 is mechanically connected to the other parts of the system especially to the nozzle body holder 19 by means of a holding device 18.

FIGURE 3 shows in enlarged scale the surrounding of the branching point A. Tube 22 leading to the nozzle is connected within the ceramic member 8 with tube 11 by butt welding.

The impulse-like oil pressure wave generated by pump 1 and arriving through capillary tube 7 and insulating capsule 9′ will propagate from A into tube 11 and into tube 22. Tube 11 is about ten- to twenty-fold longer than the injected stream 32 at ignition time. Assumed that the length of the fuel stream is 55 mm. and its velocity 100 meters per second, the capillary tube 11 serving as so-called adaption tube will be 75 mm. longer than tube 22.

The two cups 16 and 17 form a casing which constantly presses against the piezo-electric members 14. The pressure of the impulse-like pressure wave arriving in the hollow interior 12 of the pressure chamber must be higher than the above mentioned constant pressure, so that the bearing surfaces 13a of the elastic walls 13 become separated. Thus suddenly by a mechanical power the necessary electric ignition power is produced. The insulating member 15, 15′ is cast of silicon-rubber.

The capillary tube 7 is cemented tightly and vibration-proof at 9 by means of a soldered-on spiral wire which engages with a corresponding thread formed in the extension 9 of the ceramic member 8. Tube 22 with the welded-on disc electrode 24 is fixed within the ceramic piece 8 in a similar manner.

When manufacturing respectively assembling the parts of the injection system the tube 23, made of quartz, sintered clay or other durable insulating material, will be inserted into the nozzle body holder 19 together with tube 22 and the ceramic piece 8. A ring electrode 25 is welded on the threaded part 28 of the nozzle body holder. Then ceramic piece 8 is rolled into the nozzle body holder 19 together with ring 21, so that the plastic disc 26 is clamped. In this way no gas or oil can penetrate into the narrow free space 27 outwardly of disc 26, which fact can be checked by a small additional bore 19a in the nozzle body holder 19.

The nozzle together with the ignition generator and capillary tube is screwed into cylinder 29 which is provided with water jacket 30 and cylinder base 31. After the other elements are assembled in the manner described above, the clamping member 5, inserted in the body of the injection pump 1 is pressed by means of screw 6 tightly against the front of cylinder 3.

A cup-shaped member 4" made of copper holds the cone-shaped cylinder 3 by means of a spring disc 4' having inwardly extending spring fingers engaging the bottom face of valve 4. Valve 4 consists of hard oxyd-ceramic material, e.g. a sapphire.

FIGURE 4 shows in enlarged scale the surrounding of the gap of the nozzle Z. The ring-type electrode 25 made e.g. of nickel or tungsten is concentrically welded on to the bottom face of the threaded part 28. Tube 23 of sintered clay is ground to fit closely and is cemented to tube 22. The plane disc 24 serving as centre electrode is welded on to projections of tube 22. When cementing tube 22 into insulating tube 23 the correct width of the annular gap is obtained by means of gauges. The width of the gap determines the sparking distance of spark 33 which is discharging through the disc-shaped injected stream 32.

A small quantity of oil and the surrounding air are instantaneously heated and at once a hot ionized flame is produced. From there the combustion is quickly propagating along wall 31 of the combustion chamber and also within the drops of the fuel stream which is radially injected to all sides in the shape of a flat disc.

FIGURE 5 shows another embodiment of the pressure chamber. The walls are composed of many thin elastic plates to avoid excessive strain of the free parts of the walls. The plates are made preferably of age hardened alloy. The front walls 13 of the pressure chamber shown in FIGURE 5 are each composed of e.g. ten plates being 0.06 mm. thick. These plates are inserted into ring 13' which has an inner shoulder. Tube 11 is soldered into a bore of said inner shoulder. A small disc 12" with radial grooves 12' fills nearly all the hollow interior 12 of the pressure chamber. Disc 12" has radial grooves 12' for better distribution of the oil pressure. The constant initial pressure which is produced by the cup-shaped parts 16 and 17 of the casing against the piezo-electric members 14 is acting on both sides of disc 12". The oil pressure wave generated by injection pump 1 is propagating through grooves 12' instantaneously and spreading quickly over the whole area of the pressure chamber.

Ring 13' and pressed-in auxiliary rings 13" clamp all the small plates 13 tightly against oil pressure. The separating line, the rim of the plates 13, the ring 13' and the auxiliary rings 13" are welded together. Plates 13 are provided with stiffening corrugations if necessary.

FIGURE 6 shows another embodiment of the invention in which the piezo-electric generator is built in the nozzle body holder. In this embodiment an annular pressure chamber is pressing against piezo-electric cristals which are shaped like hollow cylinders. The threaded part 28 of the nozzle body holder is combined with a larger casing 19.

By means of a threaded ring 17 being provided with wrench holes it is possible to press the thin plates 13 forming part of a pressure chamber and piezo-electric cristals 14 with constant initial pressure against insulating member 26. Tube 11 having an adjusted length is bent, thus forming an arch. The special construction of the nozzle body with built-in piezo-electric generator shown in FIGURE 6 makes possible a very effective screening of piezo-electric cristals 14, so that disturbing radiations are avoided; therefore no additional interference suppressors are necessary. Cup-spring 38 presses the junction 36 and the jointplate washer 40, 40' against insulating member 23.

FIGURE 7 shows in enlarged scale a cross-section through a part of the annular pressure chamber of FIGURE 6. The outer and the inner edge of the annular plates 13 are welded together and connected by welding with adjacent metallic parts 13' and 13" in a similar way as mentioned above in the description of FIGURE 5. The adaption tube 11 is tightly soldered into the middle of the pressure chamber. In this embodiment the pressure chamber cooperates only with one piezo-electric member 14 but it would be possible also to provide two symmetrically arranged piezo-electric rings 14—similar to the embodiment of FIGURES 1 to 5. The other end of the piezo-electric cristal 14 is pressing a disc of soft metal against tube 22 and is thus electrically connected with the central electrode 24 of the injection nozzle.

FIGURE 8 shows in enlarged scale a section through the end of the nozzle, respectively the annular gap of the nozzle, which consists of tube 22 and an inserted streamlined member 24. FIGURE 9 is a view into the lower end of tube 22 and the inserted streamlined member 24.

Capillary tube 7 passes a central bore of pressure chamber 13. The end of tube 7 is arranged within the branch piece 36 as can be seen in FIGURE 10; tube 11 passes through slot 37 to said branch piece 36 and the end of tube 11 is fixed to pressure chamber 13 as shown in FIGURE 7. The other end of tube 11 and also the end of tube 7 are fixed in two parallel bores of branch piece 36. The central bore 35 of branch piece 36 has its continuation in bore 9 of the ceramic piece 8.

Owing to the insulating tube 23 around the nozzle tube 22 and the cup-shaped insulating member 26 the ignition spark can form only in front of the nozzle between 22 and 24, finding its way to the ring-electrode 25. Therefore the spark passes through the oil stream which is injected along disc of FIGURES 1 and 4 or along the inserted cone of FIGURE 8.

Without departing from the scope of the invention the aforesaid methods and means can be used also in diesel engines with conventional injection system to achieve an ignition of the very beginning of the injected oil stream respectively to avoid an ignition lag. In this way a smoother running of the engines will be obtained.

In the following the most important technical details of the new combined fuel injection and ignition system are summarized.

(a) The feeders are capillary tubes of such a small inner diameter that the pressure therein is considerably lowered during the injection period.

(b) The capillary tubes are as short as possible and they are tightly fixed, preferably soldered into the nozzle body respectively into other parts so that there is only one disconnectable connecting point at the pump.

(c) The pressure chamber is in part formed by several thin sheets which are practically plane and are pressed against a supporting plate having fine grooves for pressure distribution. Therefore the amount of oil within the pressure chamber is very small.

(d) The connecting tube between pressure chamber and injection nozzle is connected within the nozzle body as close as possible to the outlet of the stream, thus reducing the length of the capillary tubes to a minimum.

(e) The feeding tube between the pressure chamber and branching point is longer than the capillary tube within the nozzle body between the branching point and the outlet into the combustion chamber. The difference in length is so chosen that the ignition tension is generating the spark when a stream of some millimeters length has already entered the combustion chamber.

(f) Directly after leaving the nozzle the injected fuel stream passes a sparking gap between the centre electrode of the gap and ground electrode.

(g) The nozzle, the sparking gap and the piezo-electric generator form a unit, said generator being screened within the casing of the nozzle.

(h) The capillary feeding tube ends near the nozzle in an insulating member and a narrow bore within said insulating member serves as continuation of the feeding tube to the contact point of the piezo-electric generator.

(i) Within the casing of the nozzle, respectively within its threaded part, there is an insulating tube concentrically surrounding a capillary tube which is the actual nozzle.

What is claimed as new and desired to be secured by Letters Patent is:

1. A method of igniting the fuel injected into an internal combustion engine comprising the steps of intermittently producing streams of fuel under pressure; feeding one part of each stream into the cylinder of an internal combustion engine and producing with another part of each stream a pressure impulse on a piezo-electric member to thereby produce a high voltage electric current; and feeding the thus produced electric current to the point of entry of said one part of each fuel stream into the cylinder of the internal combustion engine to ignite the fuel stream substantially at the moment of entry.

2. A fuel injection and igniting system of an internal combustion engine comprising, in combination, fuel injection pump means for intermittently producing streams of compressed fuel; an injection nozzle having a free end in the cylinder of the internal combustion engine; a piezo-electric generator including a piezo-electric member and expandable pressure chamber means for exerting, when expanded, pressure on said piezo-electric member to thus produce high voltage electric current; first conduit means connecting said fuel injection pump means with said injection nozzle; second conduit means connecting said fuel injection pump means with said pressure chamber; a pair of sparking electrodes at the free end of said nozzle, one of said electrodes being grounded; and conductor means for electrically connecting said piezo-electric generator with the other of said pair of electrodes, whereby a current impulse is generated in timed sequence with the injection of fuel into the cylinder to ignite the injected fuel substantially at the moment of entry into the cylinder.

3. A fuel injection and igniting system of an internal combustion engine comprising, in combination, fuel injection pump means for intermittently producing streams of compressed fuel; an injection nozzle having a free end in the cylinder of the internal combustion engine; a piezo-electric generator including a piezo-electric member and expandable pressure chamber means having at least one elastically flexible wall engaging one end of said piezo-electric member for exerting, when expanded, pressure on said piezo-electric member to thus produce high voltage electric current; first conduit means connecting said fuel injection pump means with said injection nozzle; second conduit means connecting said fuel injection pump means with said pressure chamber; a pair of sparking electrodes at the free end of said nozzle, one of said electrodes being grounded; and conductor means for electrically connecting said piezo-electric generator with the other of said pair of electrodes, whereby a current impulse is generated in times sequence with the injection of fuel into the cylinder to ignite the injected fuel substantially at the moment of entry into the cylinder.

4. A fuel injection and igniting system of an internal combustion engine comprising, in combination, fuel injection pump means for intermittently producing streams of compressed fuel; an injection nozzle having a free end in the cylinder of the internal combustion engine; a piezo-electric generator including a piezo-electric member and expandable pressure chamber means for exerting, when expanded, pressure on said piezo-electric member to thus produce high voltage electric current; a first capillary tube connecting said fuel injection pump means with said injection nozzle; a second capillary tube connecting said fuel injection pump means with said pressure chamber; a pair of sparking electrodes at the free end of said nozzle, one of said electrodes being grounded; and conductor means for electrically connecting said piezo-electric generator with the other of said pair of electrodes, said capillary tubes having respectively such a length that the pressure impulse created in said pressure chamber means excites said piezo-electric generator a short predetermined time interval after the first particle of fuel of each fuel stream passes the free end of said nozzle.

5. A fuel injection and igniting system of an internal combustion engine comprising, in combination, fuel injection pump means for intermittently producing streams of compressed fuel; an injection nozzle having a free end in the cylinder of the internal combustion engine; a piezo-electric generator including an insulating retainer, a piezo-electric member mounted in said insulating retainer, and metallic expandable pressure chamber means in contact with one end of said piezo-electric member for exerting, when expanded, pressure on said piezo-electric member to thus produce high voltage electric current; a first capillary tube connecting said fuel injection pump means with said injection nozzle; a second capillary tube connecting said fuel injection pump means with said pressure chamber; a pair of sparking electrodes at the free end of said nozzle, one of said electrodes being grounded; first conductor means electrically connecting said metallic pressure chamber means to one of said pair of electrodes; and second conductor means electrically connecting the other end of said piezo-electric member to the other of said pair of electrodes whereby a current impulse is generated in timed sequence with the injection of fuel into the cylinder to ignite the injected fuel substantially at the moment of entry into the cylinder.

6. Fuel injection and ignition system for an internal combustion engine according to claim 2, the elastic wall of said pressure chamber means comprising a plurality of superimposed flat discs.

7. Fuel injection and ignition system for an internal combustion engine according to claim 6, wherein said pressure chamber means includes a ring, and wherein the rims of said discs being fastened within said ring leaving an elastic zone between the fastened rims and those parts of the discs which are operating the piezo-electric member.

8. Fuel injection and ignition system for an internal combustion engine according to claim 2, said pressure chamber means containing at least one supporting plate filling at least three quarters of the hollow interior of said pressure chamber means.

9. Fuel injection and ignition system for an internal combustion engine according to claim 8, the surface of said plate adjacent to said elastic wall being provided with a plurality of grooves for distributing the fuel within said chamber.

10. Fuel injection and ignition system for an internal combustion engine according to claim 7, the rims of the elastic discs of the pressure chamber means being connected by welding.

11. Fuel injection and ignition system for an internal combustion engine according to claim 10, the rims of the elastic discs of the pressure chamber being connected by welding with clamping members which clamp said discs.

12. Fuel injection and ignition system for an internal combustion engine according to claim 5, and including a casing for said injection nozzle, the piezo-electric generator being mounted on the casing of the injection nozzle.

13. Fuel injection and ignition system for an internal combustion engine according to claim 5, and including a casing for said injection nozzle, the piezo-electric generator being mounted within the casing of the injection nozzle.

14. Fuel injection and ignition system for an internal combustion engine according to claim 5, wherein said casing has a threaded part screwed into a correspondingly threaded bore of the cylinder of the combustion engine, the threaded part of the casing of the nozzle containing an insulated capillary tube, its end directed toward the combustion chamber having arms connected with a deflection plate for the fuel stream.

15. Fuel injection and ignition system for an internal combustion engine according to claim 5, one part of the capillary tube between fuel injection pump and nozzle being a rigid insulating member with a bore tightly connected to the other part of said capillary tube.

16. Fuel injection and ignition system for an internal combustion engine according to claim 5, the tube leading to the pressure chamber means of the piezo-electric generator being branched off within the nozzle body from the capillary tube between fuel injection pump means and nozzle, the branched-off part having a greater length than the length of the other tube from the branching point to the sparking gap.

17. Fuel injection and ignition system for an internal combustion engine according to claim 5, a streamlined member of such shape being inserted into the outlet tube of the nozzle that an annular gap is formed, said inserted member serving as one of said electrodes.

References Cited by the Examiner

UNITED STATES PATENTS

| | | | |
|---|---|---|---|
| 2,248,574 | 7/41 | Knight | 123—148 |
| 2,718,883 | 9/55 | Taylor | 123—32 |

RICHARD B. WILKINSON, *Primary Examiner.*